United States Patent
Poylo

[11] 3,742,453
[45] June 26, 1973

[54] AUTOMATIC HOTEL SECURITY SYSTEM USING CODED MAGNETIC CARD

[75] Inventor: Michael C. Poylo, New York, N.Y.

[73] Assignee: International Telephone and Telegraph Corporation, Nutley, N.J.

[22] Filed: Dec. 16, 1971

[21] Appl. No.: 208,715

Related U.S. Application Data

[63] Continuation-in-part of Ser. No. 71,040, Sept. 10, 1970.

[52] U.S. Cl. .......................... 340/149 A, 340/149 R
[51] Int. Cl. ............................................... H04q 5/16
[58] Field of Search .................................. 340/149 A

[56] References Cited
UNITED STATES PATENTS

| | | | |
|---|---|---|---|
| 3,544,769 | 12/1970 | Hedin | 340/149 A X |
| 3,590,333 | 6/1971 | Blum | 340/149 A X |
| 3,596,250 | 7/1971 | Sedley | 340/167 R |

*Primary Examiner*—Harold I. Pitts
*Attorney*—C. Cornell Remsen, Jr., Menotti J. Lombardi, Jr. et al.

[57] ABSTRACT

This invention relates to a method and apparatus for providing an automatic registration and security system for use primarily in hotels. A person seeking accommodations possesses a magnetic card which he inserts into a card reader. A magnetic recorder reads fixed information, i.e., name, address, card number, and transmits this information to a computer. The computer generates a coded number which is temporarily assigned to a particular room number, and a magnetic recorder associated with the card reader records this coded number on a second magnetic area on the card. The room number is also displayed to the holder of the card. The card holder then proceeds to the room which he has been assigned and again inserts his card into a second card reader located at the room. The variable coded room number and a fixed room identification code are transmitted via the local telephone line to the computer where they are compared with the previously stored information. If an affirmative comparison is made, a signal is transmitted over the telephone lines which unlocks the appropriate hotel room door.

6 Claims, 2 Drawing Figures

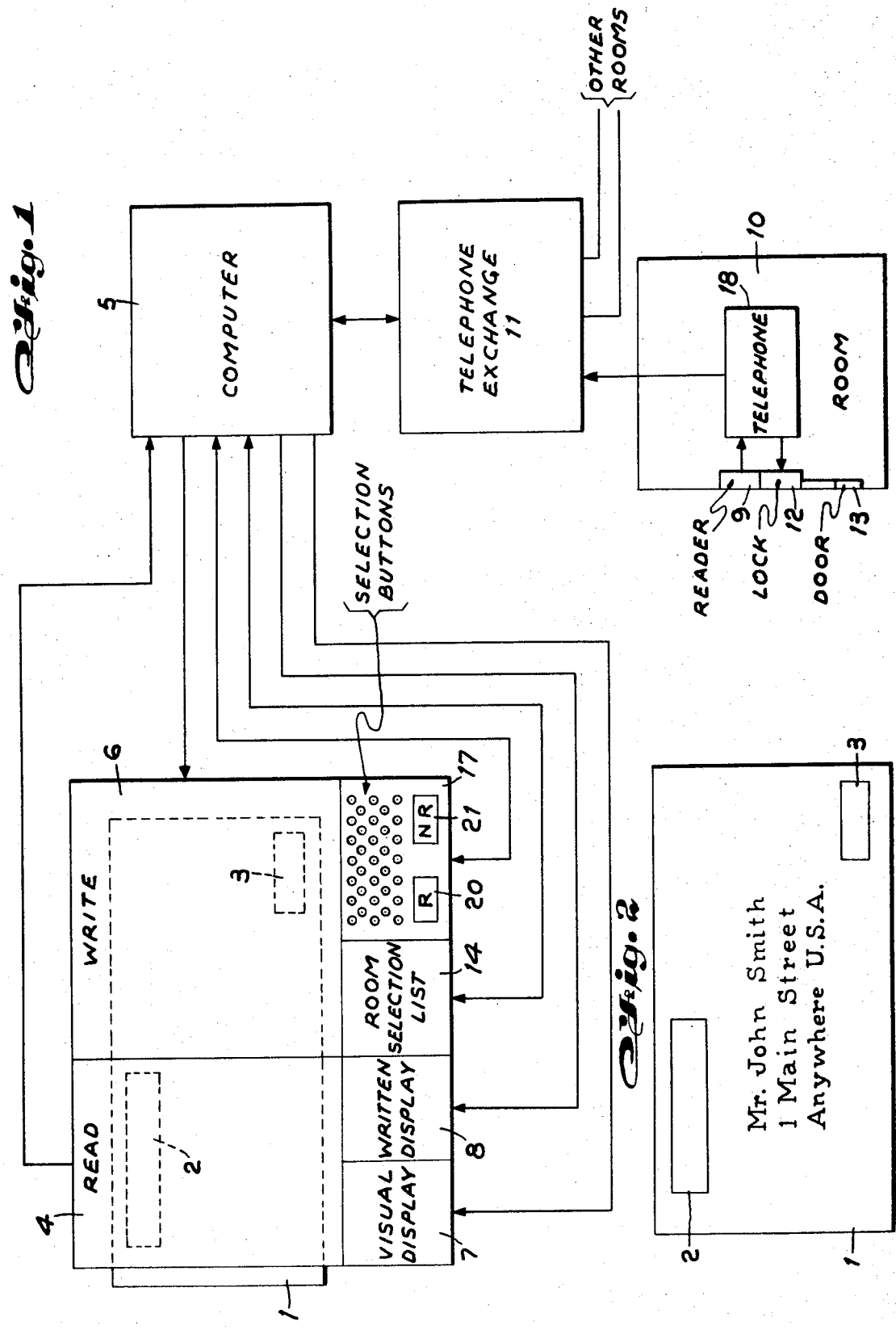

3,742,453

AUTOMATIC HOTEL SECURITY SYSTEM USING CODED MAGNETIC CARD

CROSS REFERENCES TO RELATED APPLICATIONS

This is a continuation-in-part of co-pending application Ser. No. 71,040, filed Sept. 10, 1970, entitled "A Magnetic Card Security System", assigned to the assignee of the present invention, and is related to U.S. Pat. No. 3,692,981 filed Nov. 12, 1970, issued Sept. 19, 1972, entitled "Card Reader", and assigned to the assignee of the present invention.

BACKGROUND OF THE INVENTION

This invention relates to an automatic check-in/check-out and security system employing magnetic cards for use in hotels.

Hotels for the most part rely on locked doors and personnel for distributing keys to authorized persons for achieving a certain degree of security. This type of security system has the obvious drawback of requiring large numbers of personnel. Additionally, long delays in checking in and checking out at times of peak activity are often involved. This system has further disadvantages. First, often times guests will check out having not returned their key, and could regain entry to the room to which the key corresponds after the room is no longer assigned to the key holder. This substantially degrades the security of the hotel. Second, if the key is lost, there is nothing to prevent an unauthorized person from entering the corresponding room.

Credit cards which have wide coverage do of necessity carry a large number of digits, often alpha-numeric. For instance, FNCB Master Charge carries 12 numbers and Avis carries 11 numbers and four letters. In most cases the large number of digits is required to accommodate numerous card holders and to provide information other than identity. Many of the existing cards have not been designed for direct computer input but rather for clerical assistance.

SUMMARY OF THE INVENTION

It is an object of this invention to provide a magnetic card security system and automatic check-in/check-out system for use in hotels whereby the holder of a hotel chain credit card can gain access to a reserved or available room and then check out without requiring the intervention of a clerk.

It is a further object of the present invention to provide a magnetic credit card having a magnetic field which contains a lesser number of numerical digits.

It is further object of this invention that the credit card be provided with a virgin field of magnetic material upon which variable information is recorded which can be read by a conventional magnetic reader.

It is a further feature of this invention that the variable information utilized can be varied quickly and at little cost.

It is a further feature of this invention that information transmitted between the card reader located at the room and the computer, and between the computer and the hotel room door lock be transmitted over the local telephone lines.

According to a broad aspect of the invention, there is provided an automatic security system for use in a hotel having a plurality of rooms each containing a telephone connected to a telephone exchange comprising a magnetic card having a plurality of magnetically distinct information areas, a first area for containing fixed information and a second area for containing variable information, a first means for reading said plurality of magnetic retaining areas on said card, computer means coupled to said first means for reading and coupled to said telephone exchange for storing and processing said fixed and variable information, recording means coupled to said computer for receiving variable information from said computer and magnetically recording said variable information on said second area, said variable information representing a coded room number, a second means for reading said card accessible from the exterior of a room in said hotel and coupled to said computer via the telephone line in said room for transmitting a room identification signal and said variable information, to said computer, said computer comparing said variable information with said stored information and providing a signal if an affirmative comparison is made and operative means associated with said room and responsive to said affirmative signal for unlocking the door of said room.

The above and other objects and features of the present invention will be more clearly understood from the following detailed description taken in conjunction with the accompanying drawings, in which:

BRIEF DESCRIPTION OF THE DRAWINGS

FIG. 1 is a block diagram of an arrangement according to the invention; and

FIG. 2 is a plan view of a magnetic card for use with the arrangement shown in FIG. 1.

DESCRIPTION OF THE PREFERRED EMBODIMENT

Referring to FIG. 2, there is shown a magnetic card 1, which is primarily constructed of a non-magnetic material, e.g. plastic, having a first magnetic information retaining area 2 and a second magnetic information retaining area 3, area 3 being smaller and required to retain a lesser number of discrete bits of information. Area 2 permanently contains information which identifies the holder of the magnetic card, and area 3 contains variable information which is associated with a particular local area, for example, a hotel room.

In FIG. 1, there is shown a magnetic card reader 4 which may be located in a hotel lobby. Reader 4 is coupled to a computer 5 which may be located in the hotel basement or even at a location remote from the hotel. Three different modes of operation are possible.

The first occurs when a guest has made a previous reservation. In this case, the reservation has been entered in the memory of computer 5 and associated, in memory, with the magnetic card number. Upon arrival, a guest inserts his card into reader 4, which reads and transmits the card number to computer 5. The guest may then press a button 20 marked "reservation" to inform the computer that he has made a prior reservation. Computer 5 searches its memory banks to verify the reservation, searches a table of available rooms, and assigns a room. Computer 5 then retrieves a code number assigned to that room for that day. It is important to note that the room number code is assigned automatically by the computer. This can be easily accomplished by means of a random code generator of the type well known in the art and easily implemented. In should be clear that this in itself provides for a higher degree of security. The coded number is then transferred to recorder 6 which contains a magnetic write head. Recorder 6 receives the coded room number from computer 5 and magnetically records it on virgin area 3 of card 1.

Located adjacent reader 4 and recorder 6 is a visual display unit 7 and a written display unit 8, both of which are coupled to computer 5. The actual room number will be displayed to the card holder on visual display unit 7 and a ticket having printed thereon the actual room number will be produced by written display unit 8. Visual display 7 and written display 8 are common and well known in the art, and a more detailed discussion of them is not deemed necessary. It is important to note that the coded room number is not known to anyone. The actual room number and the coded room number are physically separated, and the coded room number, not physically apparent, cannot be read without the proper equipment. To provide additional safety, the code is changed when the next customer is assigned that particular room.

The second situation occurs when a guest does not have a prior reservation. He may proceed as described above with the exception that he presses button 21 designated "no reservation". A room selector 14 coupled to computer 5 displays the available rooms and their cost. The guest, via selection button, selects the type of accommodation he desires and the number days he expects to stay. Computer 5 searches the table of available rooms in its memory corresponding to the guest's choice and duration of rental. If a room is available, a coded room number is assigned as described above. If no room is available, an alarm or signal refers the guest to the desk.

The third situation arises when a guest does not possess a credit card. In this case, the desk provides the customer with a credit card similar to the above-described card. In all cases, guests have a card which becomes a key to the door of their hotel room.

Knowing the room number, the guest now proceeds to his assigned room at which he finds magnetic card reader 9 mounted in room 10, the input of card reader 9 being accessible from outside room 10. Magnetic card 1 is introduced into reader 9. A switch actuated by the card causes telephone 18 to go "off hook". Card reader 9 introduces a mechanical delay to allow sufficient time for a dial tone to be received. A tone generated in card reader 9 provides access to computer 5 through telephone exchange 11. Having accessed the computer, the card is released upward at a constant speed, provided by the card reader mechanism, to allow accurate reading of the card. Two tracks on the card could be used; one for the information to be transmitted (code) and one for timing (clock). Also, the information on the card could be duplicated in parallel or in series to increase reliability.

The information on the card along with a signal identifying the card reader (actual room or telephone number) is transmitted to computer 5 via local telephone 18 located in hotel room 10. Line identification systems are now well known and a more detailed discussion is not deemed necessary. The code number of the room is entered into a first register in the computer. The physical room number is entered into a second register. The computer then searches a table of code numbers until it locates the appropriate code number, retrieves its associated actual room number and places the actual room number in a third register. The contents of the second and third registers are then compared. If an affirmative comparison is made, a signal is sent to the room via telephone 18 to the locking device 12. The unlocking signal merely releases electrically the locking mechanism.

The subsystem comprising reader 9 which contains a reading head and amplifier is transistorized and powered by a central battery as is the release mechanism. This provides uninterrupted operation if a power failure should occur.

To provide a high degree of security, the signal sent by the computer can be coded at the computer and recognized at the reader so that the mere sending of a dc pulse will not open the door.

It should be clear that the operations performed at the computer is one which could be easily programmed by a skilled programmer, and that the use of the computer simplifies the logic required in reader 9.

It will be seen that this results in a simple and inexpensive security system since transmission to and from the computer is accomplished over telephone lines already existing in each room and which therefore do not require major alterations or additions, or the increased expense of additional wiring in newly constructed units. Card reader 9 is thus seen to be essentially an extension of telephone 18. A suitable card reader for this purpose is described in said related co-pending serial application number 88,898, first filed Nov. 12, 1970 and assigned to the assignee of the present invention. Upon checking out, the card holder inserts his magnetic card into reader 4 and recorder 6 indicating, by suitable controls not shown, but of the type well known in the art, that he is severing his relationship with his assigned room. Upon receipt of this information, the computer will erase the coded room number from area 3 on the card. This has a security advantage of insuring that the card cannot be used to re-enter the room after authorization to enter has been terminated. A further security precaution which is contemplated by this invention is to periodically change the variable information or code which is associated with a particular room. For example, if four alpha-numeric characters are recorded on area 3, three alpha-numeric characters being associated with a particular room, the fourth character recorded could correspond to a particular time period. It is therefore seen that even if area 3 is not erased, the variable information recorded cannot be used indefinitely to enter a particular room.

The use of a limited number of alpha-numeric characters simplifies the system to an appreciable extent since now only a simple and inexpensive card reader is required rather than one having the capacity to read a standard code or perhaps 12 alpha-numeric characters. Also, the card reader may be of a simple and of a less expensive design since the comparison with the code assigned to the secured area is not made by the card reader itself, but rather by the central computer. Finally, not only is a simple and inexpensive card reader sufficient at the room, but the operation of the central computer itself will be simpler and faster since it must process, at times other than check-in and check-out, only the lesser amount of information contained on the smaller area of the card.

By coding the card in a particular manner, it may be used as a pass key to obtain entry to all rooms or selected groups of rooms by authorized personnel.

It is to be understood that the foregoing description of specific examples of this invention is made by way of example only and is not to be considered as a limitation on its scope.

I claim:

1. An automatic security system for use in a hotel having a plurality of rooms each containing a telephone comprising:
   a telephone exchange coupled to each telephone line;
   a magnetic card having a plurality of magnetically distinct information areas, a first area for containing fixed information and a second area for containing variable information;
   a first means for reading said plurality of magnetic retaining areas on said card:
   computer means coupled to said first means for reading and coupled to said telephone exchange for storing and processing said fixed and variable information;
   recording means coupled to said computer for receiving variable information from said computer and magnetically recording said variable information on said second area, said variable information representing a coded room number;
   a second means for reading said card, accessible from the exterior of a room in said hotel and coupled to said computer via the telephone line in said room, for transmitting a room identification signal and said variable information, to said computer, said computer comparing said variable information with said stored information and providing a signal if an affirmative comparison is made; and
   operative means associated with said room and responsive to said affirmative signal for unlocking the door of said room.

2. An automatic security system according to claim 1, further comprising a visual display unit coupled to said computer for displaying the identity of the room associated with said variable information.

3. An automatic security system according to claim 2, further comprising centrally located printing means for printing the identity of the room associated with said variable information.

4. An automatic security method for use in an hotel having a plurality of rooms each containing a telephone connected to a telephone exchange, said method employing a magnetic card having a plurality of magnetically distinct information retaining areas containing fixed information on at least one magnetic area and variable information on at least one magnetic area comprising the steps of:
   reading, at a central location, said magnetic information;
   transmitting said magnetic information to a computer for storing and processing;
   receiving, from said computer, said variable information representing a coded room number;
   recording said variable information on said magnetic card;
   reading said variable information in a magnetic card reader accessible from the exterior of a room in said hotel, said room corresponding to said coded room number;
   transmitting said read information and a line identification signal to said computer via said telephone line said telephone exchange;
   comparing said variable information with said stored information
   generating a signal if an affirmative comparison is made; and
   applying said affirmative signal to the lock on the door of said room.

5. An automatic security method according to claim 4 further comprising the steps of:
   visually displaying the identity of said room associated with said variable information; and
   printing the identity of said room associated with said variable information.

6. An automatic security method according to claim 4 further comprising the step of:
   changing said coded room number in said computer when said card is no longer associated with said room.

* * * * *